(12) United States Patent
Osaka et al.

(10) Patent No.: US 12,355,549 B2
(45) Date of Patent: Jul. 8, 2025

(54) WIRELESS COMMUNICATION SYSTEM, WIRELESS COMMUNICATION METHOD, TRANSMITTER, AND RECEIVER

(71) Applicant: NIPPON TELEGRAPH AND TELEPHONE CORPORATION, Tokyo (JP)

(72) Inventors: Kazuo Osaka, Musashino (JP); Toshifumi Miyagi, Musashino (JP); Hayato Fukuzono, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 105 days.

(21) Appl. No.: 18/039,449

(22) PCT Filed: Dec. 21, 2020

(86) PCT No.: PCT/JP2020/047669
§ 371 (c)(1),
(2) Date: May 30, 2023

(87) PCT Pub. No.: WO2022/137282
PCT Pub. Date: Jun. 30, 2022

(65) Prior Publication Data
US 2024/0007212 A1    Jan. 4, 2024

(51) Int. Cl.
*H04J 1/08*      (2006.01)
(52) U.S. Cl.
CPC .................... *H04J 1/08* (2013.01)

(58) Field of Classification Search
CPC .......... H04B 7/04013; H04B 7/10; H04J 1/08; H04J 2011/0009; H04L 5/003; H04L 5/04
See application file for complete search history.

(56) References Cited

FOREIGN PATENT DOCUMENTS

WO    WO-2004112286 A1 * 12/2004 ............ H04B 10/503

OTHER PUBLICATIONS

Benjebbour Anas et al., "Demonstration Experiment for Improvement of Frequency Utilization Efficiency by Smartphone-sized NOMA-Compatible Chipset", NTT DOCOMO Technical Journal, vol. 26, No. 1, (Apr. 2018), p. 6-15.

* cited by examiner

*Primary Examiner* — Phuc H Tran
(74) *Attorney, Agent, or Firm* — Harness, Dickey & Pierce, P.L.C.

(57) ABSTRACT

A wireless communication method according to an embodiment includes converting n+1 signals into n predetermined power signals obtained by setting a C/N to a predetermined value and into n divided signals obtained by setting the C/N to 1/n of a predetermined value and performing division into n, superimposing the n predetermined power signals and the n divided signals that have been converted, non-orthogonally so as to be n multiplexed signals for the n frequency channels, transmitting the n multiplexed signals, receiving n multiplexed signals, demodulating n predetermined power signals from the n multiplexed signals that have been received, creating replica signals of each of the n predetermined power signals, subtracting each of the n replica signals that have been created from each of the n multiplexed signals, and combining the n subtracted signals.

6 Claims, 7 Drawing Sheets

WIRELESS COMMUNICATION SYSTEM, WIRELESS COMMUNICATION METHOD, TRANSMITTER, AND RECEIVER

CROSS-REFERENCE TO RELATED APPLICATIONS

This application is a 371 U.S. National Phase of International Application No. PCT/JP2020/047669, filed on Dec. 21, 2020. The entire disclosure of the above application is incorporated herein by reference.

TECHNICAL FIELD

The present invention relates to a wireless communication system, a wireless communication method, a transmission device, and a reception device.

BACKGROUND ART

In a wireless communication system such as a fifth generation mobile communication system (5G), massive multiple input multiple output (MIMO) using a multi-element antenna, non-orthogonal multiple access (NOMA), and the like are known as technologies for improving frequency utilization efficiency.

For example, NOMA is a multiple access method in which, in a case where a base station transmits a signal to a plurality of user terminals (UEs) in the downlink, a plurality of user signals is multiplexed and transmitted on the same wireless resource by intentionally non-orthogonally multiplexing the plurality of user signals in a power axis direction (see, for example, Non Patent Literature 1).

CITATION LIST

Non Patent Literature

Non Patent Literature 1: Benjebbour Anas and two others, "Demonstration Experiment for Improvement of Frequency Utilization Efficiency by Smartphone-sized NOMA-Compatible Chipset", NTT DOCOMO Technical Journal Vol. 26 No. 1 (April 2018), p. 6-15

SUMMARY OF INVENTION

Technical Problem

However, the technology disclosed in Non Patent Literature 1 is a technology for multiplexing signals transmitted from one base station to a plurality of user terminals located in different directions and distances, and cannot be applied to multiplexing frequency channels in the same wireless section such as fixed microcommunication.

The present invention has been made in view of the above-described problems, and an object thereof is to provide a wireless communication system capable of multiplexing and transmitting a larger number of signals than the number of frequency channels even in the same wireless section, a wireless communication method, a transmission device, and a reception device.

Solution to Problem

A wireless communication system according to an aspect of the present invention is a wireless communication system including a transmission device and a reception device that perform wireless communication using n (n≥2) frequency channels, in which the transmission device includes a conversion unit that converts n+1 signals into n predetermined power signals obtained by setting a C/N to a predetermined value and into n divided signals obtained by setting the C/N to 1/n of a predetermined value and performing division into n, a superimposition unit that superimposes the n predetermined power signals and the n divided signals converted by the conversion unit non-orthogonally so as to be n multiplexed signals for the n frequency channels, and a transmission unit that simultaneously transmits the n multiplexed signals obtained by superimposing by the superimposition unit by the n frequency channels, and the reception device includes a reception unit that receives n multiplexed signals transmitted by the n frequency channels, a demodulation unit that demodulates n predetermined power signals from the n multiplexed signals received by the reception unit, a replica creation unit that duplicates each of the n predetermined power signals demodulated by the demodulation unit and creates n replica signals, a subtraction unit that subtracts each of the n replica signals created by the replica creation unit from each of the n multiplexed signals received by the reception unit to calculate n subtracted signals, and a combining unit that combines the n subtracted signals calculated by the subtraction unit.

A wireless communication method according to an aspect of the present invention is a wireless communication method in which a transmission device and a reception device perform wireless communication using n (n≥2) frequency channels, the method including a conversion step of converting n+1 signals into n predetermined power signals obtained by setting a C/N to a predetermined value and into n divided signals obtained by setting the C/N to 1/n of a predetermined value and performing division into n, a superimposition step of superimposing the n predetermined power signals and the n divided signals that have been converted, non-orthogonally so as to be n multiplexed signals for the n frequency channels, a transmission step of simultaneously transmitting the n multiplexed signals obtained by superimposing, by the n frequency channels, a reception step of receiving the n multiplexed signals transmitted by the n frequency channels, a demodulation step of demodulating n predetermined power signals from the n multiplexed signals that have been received, a replica creation step of duplicating each of the n predetermined power signals that have been demodulated and creating n replica signals, a subtraction step of subtracting each of the n replica signals that have been created from each of the n multiplexed signals that have been received to calculate n subtracted signals, and a combining step of combining the n subtracted signals that have been calculated.

A transmission device according to an aspect of the present invention is a transmission device that performs wireless communication with a reception device by using n (n≥2) frequency channels, the transmission device including a conversion unit that converts n+1 signals into n predetermined power signals obtained by setting a C/N to a predetermined value and into n divided signals obtained by setting the C/N to 1/n of a predetermined value and performing division into n, a superimposition unit that superimposes the n predetermined power signals and the n divided signals converted by the conversion unit non-orthogonally so as to be n multiplexed signals for the n frequency channels, and a transmission unit that simultaneously transmits the n multiplexed signals obtained by superimposing by the superimposition unit by the n frequency channels.

A reception device according to an aspect of the present invention is a reception device that performs wireless communication with a transmission device by using n (n≥2) frequency channels, the reception device including a reception unit that receives n multiplexed signals transmitted by the n frequency channels, a demodulation unit that demodulates n predetermined power signals from the n multiplexed signals received by the reception unit, a replica creation unit that duplicates each of the n predetermined power signals demodulated by the demodulation unit and creates n replica signals, a subtraction unit that subtracts each of the n replica signals created by the replica creation unit from each of the n multiplexed signals received by the reception unit and calculates n subtracted signals, and a combining unit that combines the n subtracted signals calculated by the subtraction unit.

Advantageous Effects of Invention

According to the present invention, it is possible to multiplex and transmit a larger number of signals than the number of frequency channels even in the same wireless section.

DESCRIPTION OF EMBODIMENTS

Figure 1:
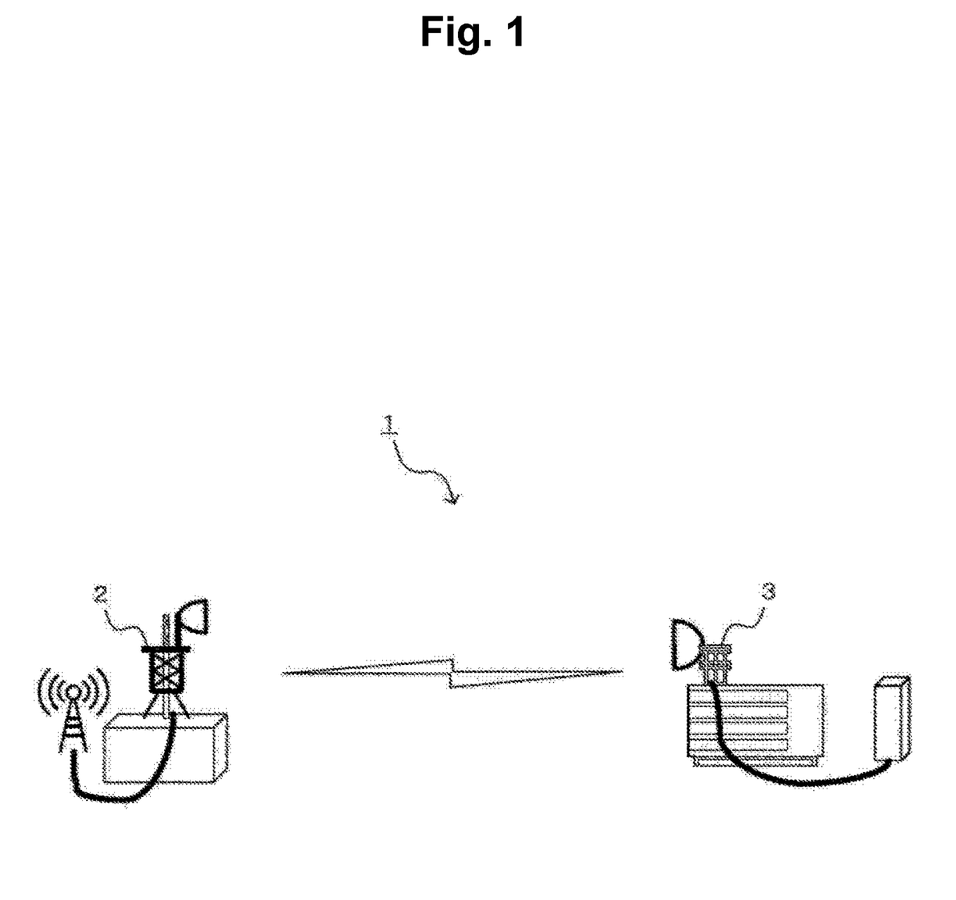
FIG. 1 is a diagram illustrating a configuration example of a wireless communication system according to an embodiment.

Hereinafter, an embodiment of a wireless communication system will be described with reference to the drawings. FIG. 1 is a diagram illustrating a configuration example of a wireless communication system 1 according to the embodiment. As illustrated in FIG. 1, the wireless communication system 1 includes a transmission station 2 and a reception station 3, and the transmission station 2 and the reception station 3 are configured to perform wireless communication such as fixed microcommunication.

For example, the transmission station 2 transmits a signal to the reception station 3 by non-orthogonal multiple access (NOMA) using n (n≥2) frequency channels. The n frequency channels are frequency channels that are different from each other in at least one of a polarization plane and a frequency.

Hereinafter, the wireless communication system 1 will be described by exemplifying a case where the transmission station 2 and the reception station 3 are wireless communication devices that transmit and receive signals to and from each other, but the transmission station 2 functions as a transmission device and the reception station 3 functions as a reception device.

Figure 2:
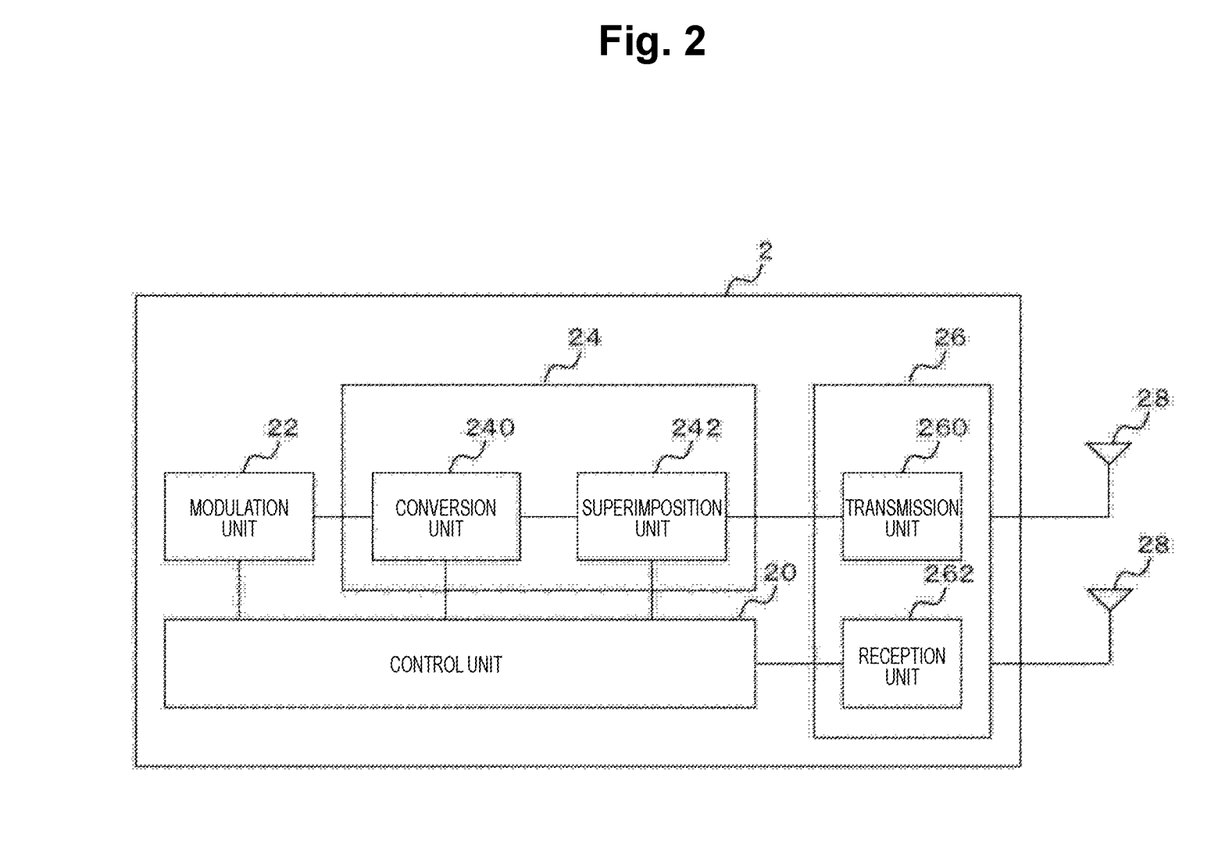
FIG. 2 is a functional block diagram illustrating functions of a transmission station according to the embodiment.

FIG. 2 is a functional block diagram illustrating functions of the transmission station 2 according to the embodiment. As illustrated in FIG. 2, the transmission station 2 includes, for example, a control unit 20, a modulation unit 22, a NOMA processing unit 24, a communication unit 26, and a plurality of antennas 28. Here, a case where the transmission station 2 includes a plurality of antennas 28 and performs MIMO transmission will be described as an example, but the transmission station 2 may include one antenna 28 and may not perform MIMO transmission.

The control unit 20 controls each unit constituting the transmission station 2, generates, for example, n+1 transmission signals for the reception station 3, and outputs the generated transmission signals to the modulation unit 22.

The modulation unit 22 performs, for example, quadrature amplitude modulation (QAM) on the n+1 transmission signals generated by the control unit 20, and outputs the modulated transmission signal to the NOMA processing unit 24.

The NOMA processing unit 24 includes, for example, a conversion unit 240 and a superimposition unit 242, performs NOMA processing on n+1 transmission signals modulated by the modulation unit 22, and outputs the transmission signal subjected to the NOMA processing to the communication unit 26.

The conversion unit 240 converts the n+1 transmission signals into n predetermined power signals obtained by setting a carrier-to-noise ratio (C/N) to a predetermined value and into n divided signals obtained by setting the C/N to 1/n of a predetermined value and performing division into n, and outputs the converted transmission signals to the superimposition unit 242.

For example, in a case where the C/N required for demodulating the transmission signal is A, the conversion unit 240 converts n+1 transmission signals into n (first to nth) predetermined power signals with the C/N being A and one (n+1 th) divided signal obtained by setting the C/N to (1/n)A and performing division into n.

The superimposition unit 242 superimposes the n predetermined power signals and the n divided signals converted by the conversion unit 240 non-orthogonally so as to be n multiplexed signals for the n frequency channels, and outputs the superimposed n multiplexed signals to the communication unit 26.

For example, the superimposition unit 242 non-orthogonally superimposes the n predetermined power signals and one divided signal obtained by performing division into n that have been output by the conversion unit 240 so as to be n multiplexed signals for the n frequency channels.

The communication unit 26 includes a transmission unit 260 and a reception unit 262, and transmits and receives wireless signals via the plurality of antennas 28.

The transmission unit 260 simultaneously transmits, for example, the n multiplexed signals obtained by superimposing by the superimposition unit 242 via the plurality of antennas 28 by the n frequency channels.

The reception unit 262 receives, for example, a signal transmitted by the reception station 3 via the plurality of antennas 28, and outputs the received signal to the control unit 20.

Figure 3:
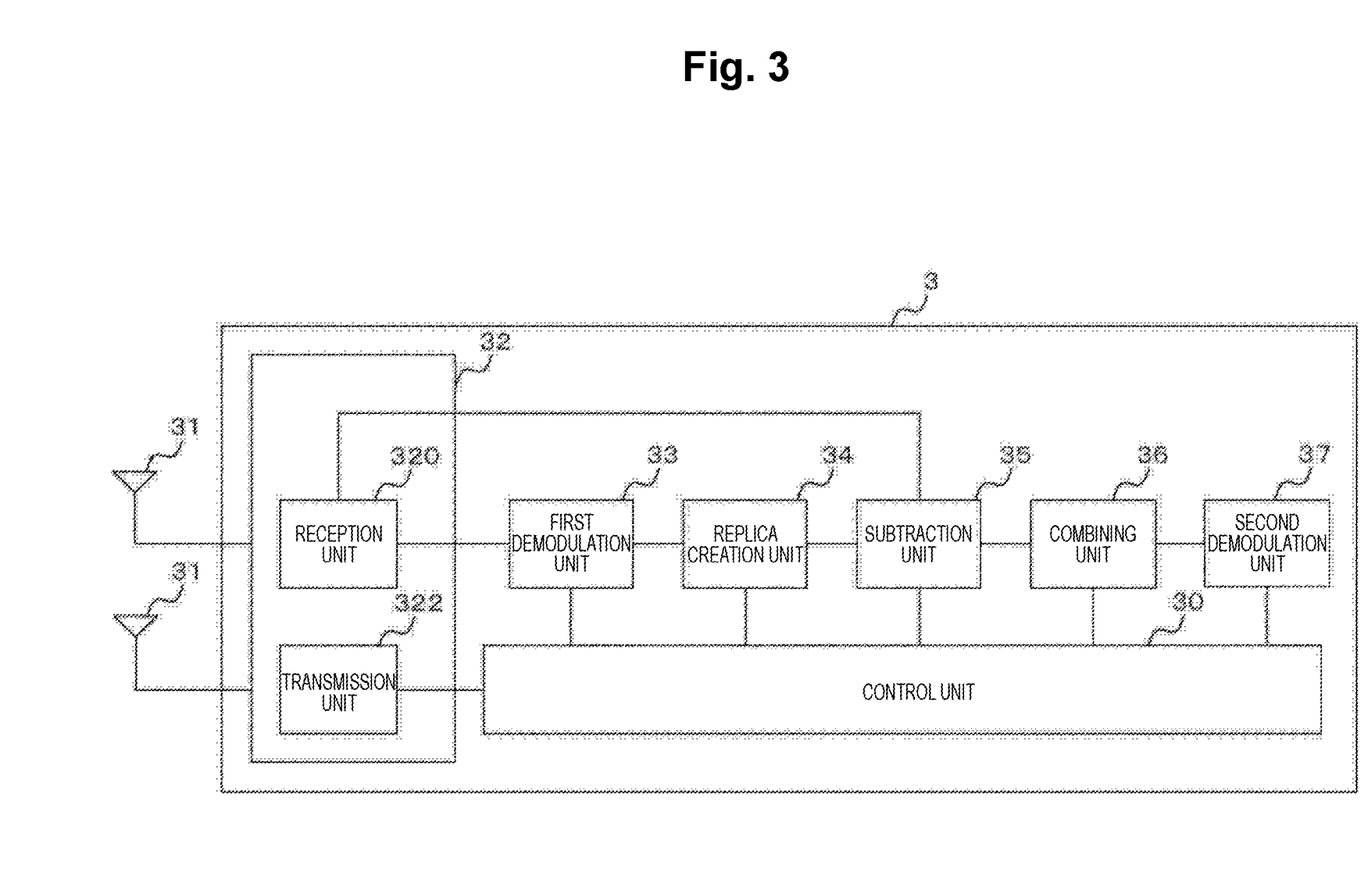
FIG. 3 is a functional block diagram illustrating functions of a reception station according to the embodiment.

FIG. 3 is a functional block diagram illustrating functions of the reception station 3 according to the embodiment. As illustrated in FIG. 3, the reception station 3 includes, for example, a control unit 30, a plurality of antennas 31, a communication unit 32, a first demodulation unit 33, a replica creation unit 34, a subtraction unit 35, a combining unit 36, and a second demodulation unit 37. Here, a case where the reception station 3 includes a plurality of antennas 31 and performs MIMO transmission will be described as an example, but the reception station 3 may include one antenna 31 and may not perform MIMO transmission.

The control unit 30 controls each unit constituting the reception station 3 and performs predetermined processing on a transmission signal and a reception signal.

The communication unit 32 includes a reception unit 320 and a transmission unit 322, and transmits and receives wireless signals via the plurality of antennas 31.

The reception unit 320 receives, via the plurality of antennas 31, n multiplexed signals transmitted from the transmission station 2 via, for example, n frequency channels, and outputs the received multiplexed signals to the first demodulation unit 33 and the subtraction unit 35.

The transmission unit 322 transmits the signal processed by the control unit 30 in a direction according to the control of the control unit 30 via the plurality of antennas 31.

The first demodulation unit 33 demodulates n predetermined power signals from the n multiplexed signals received by the reception unit 320, and outputs the demodulated n (first to nth) predetermined power signals to the control unit 30 and the replica creation unit 34.

The replica creation unit 34 duplicates each of the n predetermined power signals demodulated by the first demodulation unit 33 to create n replica signals, and outputs the created n replica signals to the subtraction unit 35.

The subtraction unit 35 subtracts each of the n replica signals created by the replica creation unit 34 from each of the n multiplexed signals received by the reception unit 320 to calculate n subtracted signals. Then, the subtraction unit 35 outputs the calculated n subtracted signals to the combining unit 36.

The combining unit 36 combines the n subtracted signals calculated by the subtraction unit 35, and outputs the combined signal to the second demodulation unit 37. For example, the combining unit 36 combines the n subtracted signals calculated by the subtraction unit 35 to restore one (n+1 th) transmission signal as a combined signal from the n divided signals.

The second demodulation unit 37 demodulates the combined signal combined by the combining unit 36, and outputs the demodulated combined signal (that is, the (n+1 th transmission signal) to the control unit 30.

That is, the control unit 30 can acquire n (first to nth) predetermined power signals from the first demodulation unit 33, and can acquire one (n+1 th) transmission signal divided into n transmission signals from the second demodulation unit 37.

The reception station 3 may be configured such that the first demodulation unit 33 also serves as the function of the second demodulation unit 37.

Next, a specific operation example of the wireless communication system 1 will be described. Hereinafter, a case where the transmission station 2 performs NOMA using two (n=2) frequency channels will be described as an example.

Figure 4:
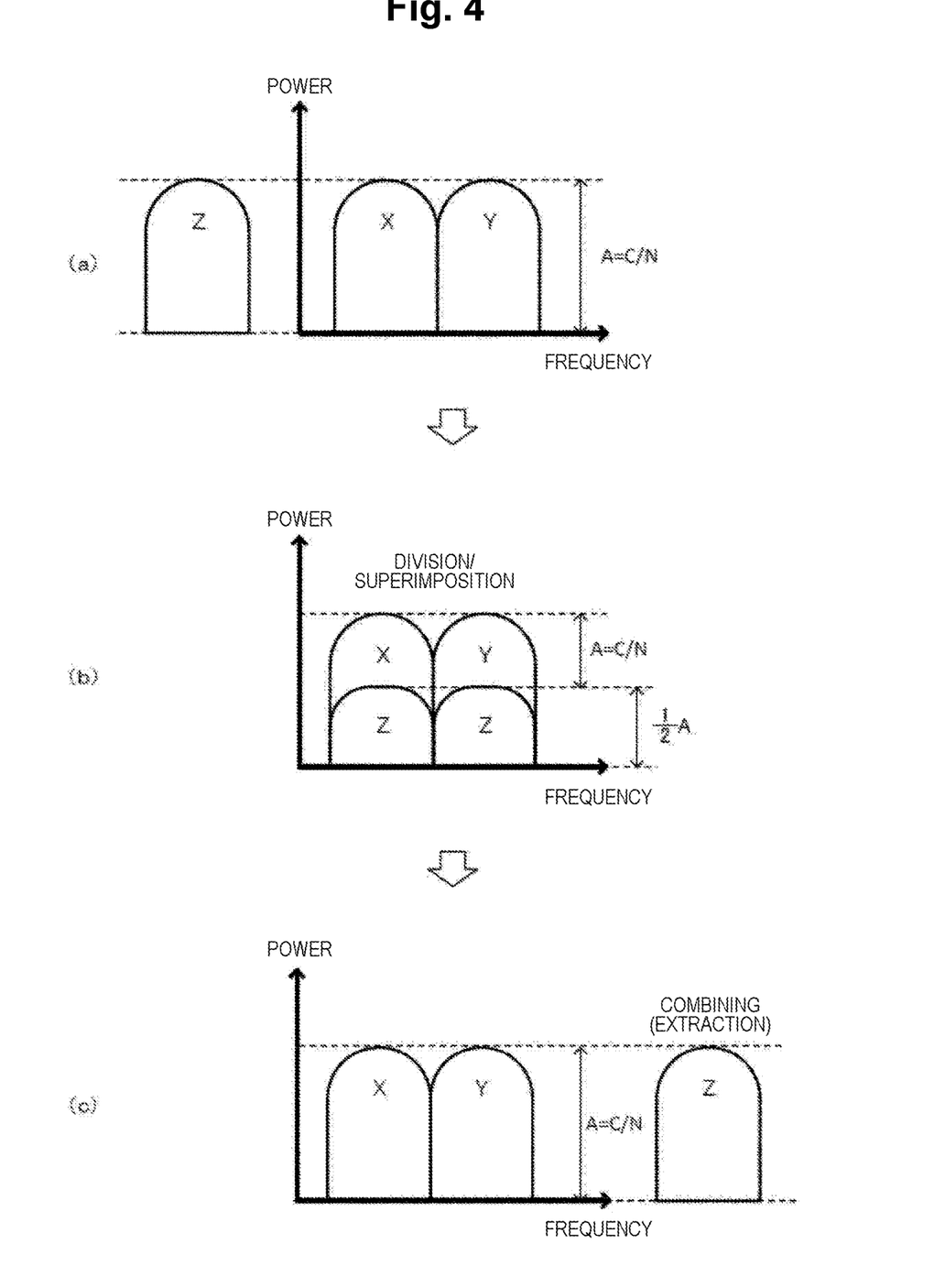
FIG. 4(a) is a diagram illustrating n+1 transmission signals transmitted by the transmission station.
FIG. 4(b) is a diagram illustrating a transmission signal converted and superimposed by the transmission station.
FIG. 4(c) is a diagram illustrating n+1 signals received and acquired by the reception station.

FIG. 4 is a diagram schematically illustrating a first example of a signal (radio wave) transmitted by the transmission station 2 and received by the reception station 3. FIG. 4(a) is a diagram illustrating n+1 (n=2) transmission signals transmitted by the transmission station 2. FIG. 4(b) is a diagram illustrating a transmission signal converted and superimposed by the transmission station 2. FIG. 4(c) is a diagram illustrating n+1 (n=2) signals received and acquired by the reception station 3.

The transmission station 2 assigns two transmission signals (for example, X and Y) among three (=n+1) transmission signals of X, Y, and Z to two frequency channels having different frequencies of the same polarization (FIG. 4(a)). At this time, C/Ns necessary for demodulating the transmission signals X, Y, and Z are denoted by A. That is, the transmission station 2 assigns two predetermined power signals (transmission signals X and Y) whose C/Ns are set to A to frequency channels having different frequencies of the same polarization.

The transmission station 2 divides the transmission signal Z not assigned to n (that is, two) frequency channels into n (that is, two) divided signals by setting C/N to 1/n (that is, ½) of A. Then, the transmission station 2 non-orthogonally superimposes the divided n (that is, two) divided signals on the predetermined power signals (transmission signals X and Y) of the n (that is, two) frequency channels, and transmits the resulting signals as n (that is, two) multiplexed signals (FIG. 4(b)). That is, the transmission station 2 simultaneously transmits multiplexed signals, which are non-orthogonally multiplexed in the power axis direction, to the reception station 3 with respect to the same wireless resource.

The reception station 3 receives n (that is, two) multiplexed signals assigned and transmitted by the transmission station 2 to n (that is, two) frequency channels.

Further, the reception station 3 demodulates n predetermined power signals from the n multiplexed signals, creates n replica signals, subtracts the replica signals from each of the n multiplexed signals (interference cancellation processing by power difference), and combines the separated and extracted n (1/n)A subtracted signals. That is, the reception station 3 can restore the transmission signal Z in which C/N is A necessary for demodulation (FIG. 4(c)).

That is, the reception station 3 can acquire and demodulate three (=n+1) signals of reception power that are C/N required for demodulation.

Figure 5:
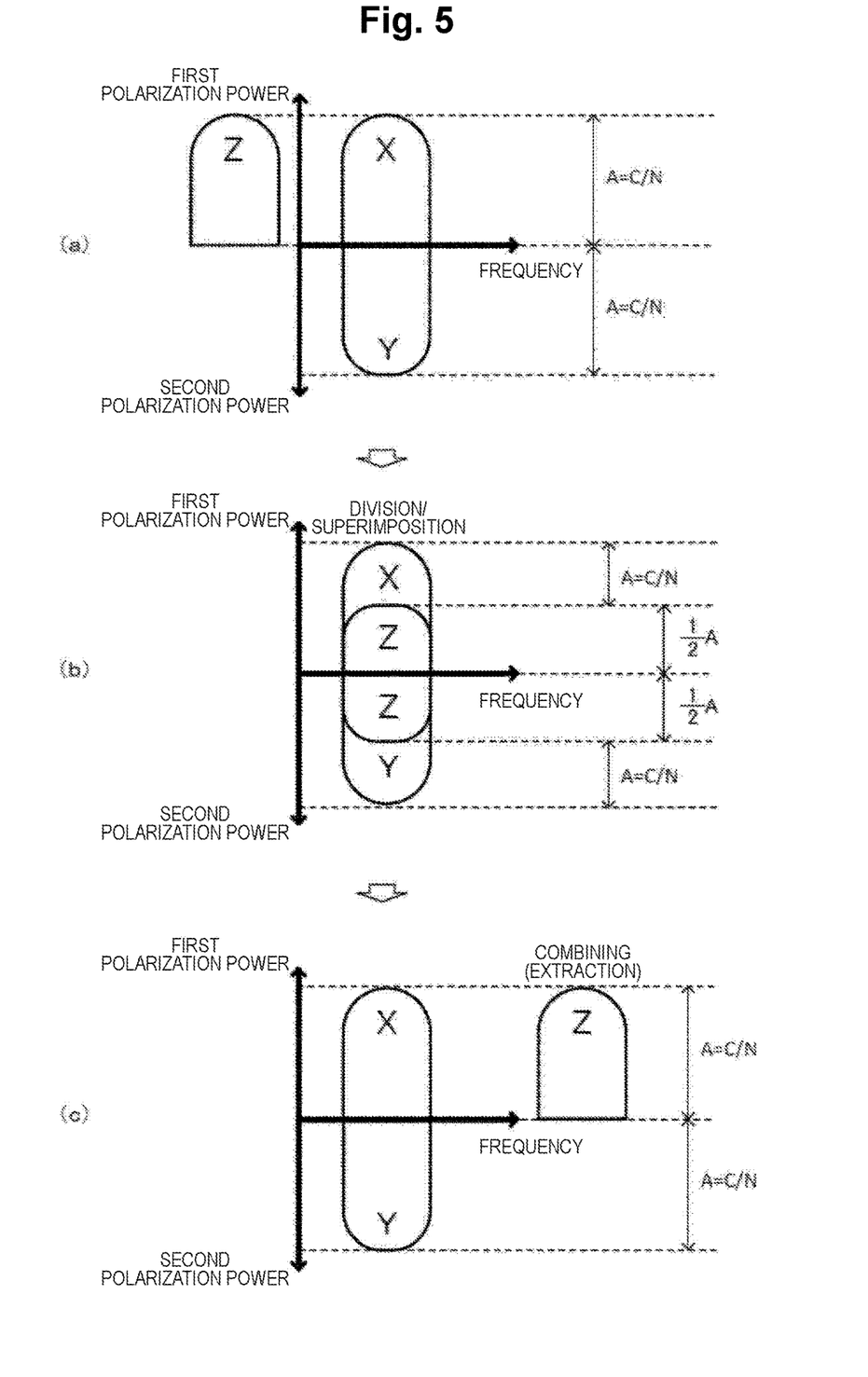
FIG. 5(a) is a diagram illustrating n+1 transmission signals transmitted by the transmission station.
FIG. 5(b) is a diagram illustrating a transmission signal converted and superimposed by the transmission station.
FIG. 5(c) is a diagram illustrating n+1 signals received and acquired by the reception station.

FIG. 5 is a diagram schematically illustrating a second example of a signal (radio wave) transmitted by the transmission station 2 and received by the reception station 3. FIG. 5(a) is a diagram illustrating n+1 (n=2) transmission signals transmitted by the transmission station 2. FIG. 5(b) is a diagram illustrating a transmission signal converted and superimposed by the transmission station 2. FIG. 5(c) is a diagram illustrating n+1 (n=2) signals received and acquired by the reception station 3.

The transmission station 2 assigns two transmission signals (for example, X and Y) among three (=n+1) transmission signals of X, Y, and Z to two frequency channels having the same frequency and polarization planes orthogonal to each other (FIG. 5(a)). For example, the transmission signal X is assigned to the first polarization that becomes the vertical polarization, and the transmission signal Y is assigned to the second polarization that becomes the horizontal polarization.

At this time, C/Ns necessary for demodulating the transmission signals X, Y, and Z are denoted by A. That is, the transmission station 2 assigns two predetermined power signals (transmission signals X, Y) whose C/N is set to A to frequency channels having different polarization planes.

The transmission station 2 divides the transmission signal Z not assigned to n (that is, two) frequency channels into n (that is, two) divided signals by setting C/N to 1/n (that is, ½) of A. Then, the transmission station 2 non-orthogonally superimposes the divided n (that is, two) divided signals on the predetermined power signals (transmission signals X and Y) of the n (that is, two) frequency channels, and transmits the resulting signals as n (that is, two) multiplexed signals (FIG. 5(b)). That is, the transmission station 2 simultaneously transmits multiplexed signals, which are non-orthogonally multiplexed in the power axis direction, to the reception station 3 with respect to the same wireless resource.

The reception station 3 receives n (that is, two) multiplexed signals assigned and transmitted by the transmission station 2 to n (that is, two) frequency channels.

Further, the reception station 3 demodulates n predetermined power signals from the n multiplexed signals, creates n replica signals, subtracts the replica signals from each of the n multiplexed signals (interference cancellation processing by power difference), and combines the separated and extracted n (1/n)A subtracted signals. That is, the reception station 3 can restore the transmission signal Z in which C/N is A necessary for demodulation (FIG. 5(c)).

Accordingly, the reception station 3 can acquire and demodulate three (=n+1) signals of reception power that are C/N required for demodulation.

Even if the transmission station 2 transmits the predetermined power signal and the divided signal in the same phase, the reception station 3 can simultaneously receive signals of the number larger than the number of channels.

The transmission station 2 only needs to convert a transmission signal of the number larger than the number of frequency channels into a multiplexed signal of the number of frequency channels so that the reception station 3 can separate and extract a divided signal on the basis of a power ratio (or a power difference) between a predetermined power signal and the divided signal, and then combine and demodulate the divided signal, and the conversion method is not limited to the above-described example.

The wireless communication system 1 may use only one of the vertical polarization and the horizontal polarization, may use both the frequency channels of the vertical polarization having the frequency f1 and the horizontal polarization having the frequency f1, or may use the frequency channels of the vertical polarization having the frequency f1 and the horizontal polarization having the frequency f2.

As described above, the wireless communication system 1 according to the embodiment converts transmission signals of the number larger than the number of frequency channels into n predetermined power signals in which C/N is set to a predetermined value and divided signals obtained by dividing C/N into n signals by setting C/N to 1/n that is a predetermined value, and non-orthogonally superimposes the converted n predetermined power signals and n divided signals so as to be n multiplexed signals for n frequency channels. Therefore, it is possible to multiplex and transmit signals of the number larger than the number of frequency channels even in the same wireless section, and to improve frequency utilization efficiency.

Figure 6:
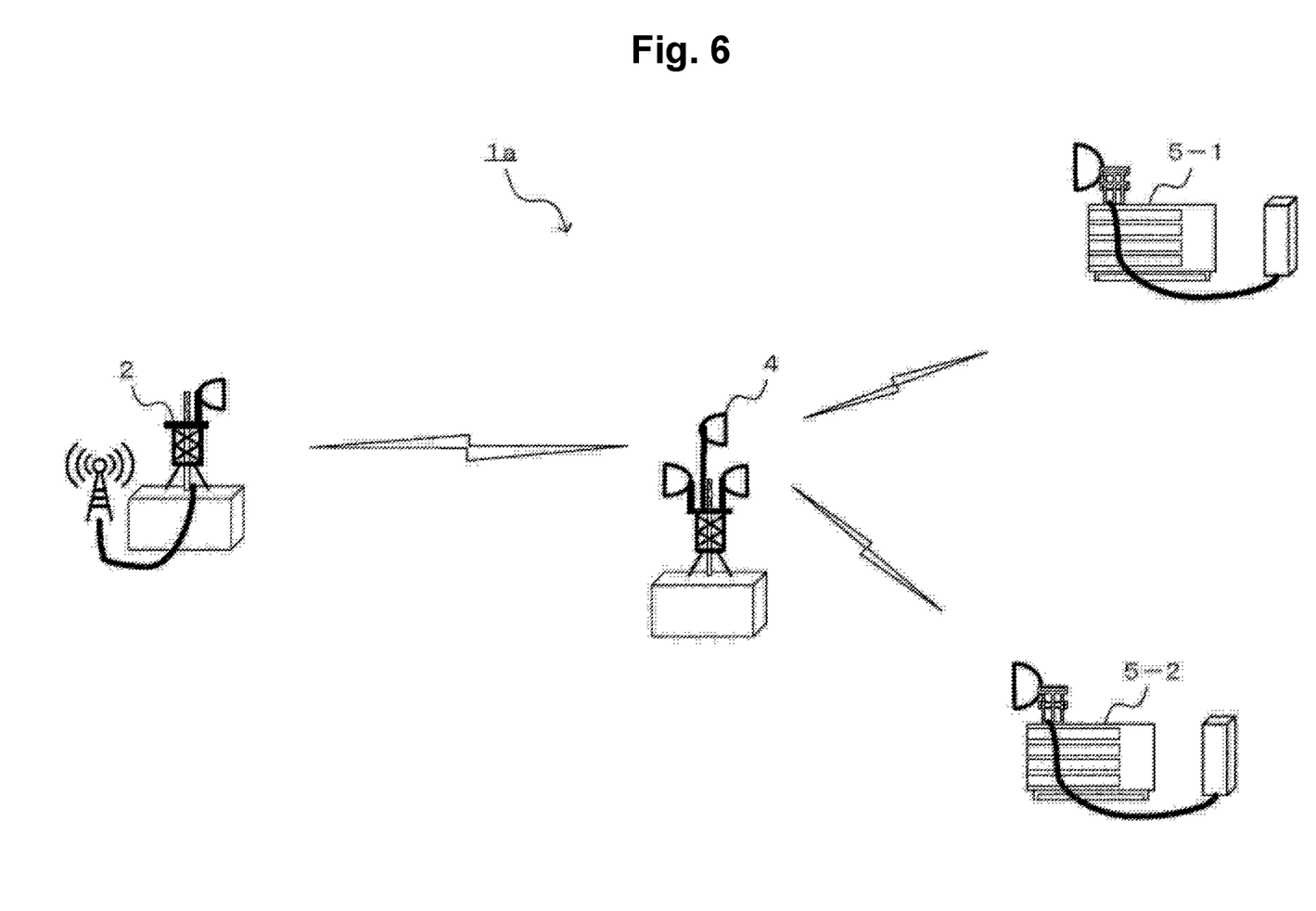
FIG. 6 is a diagram illustrating a configuration of a modification of a wireless communication system according to the embodiment.

Next, a modification of the wireless communication system 1 will be described. FIG. 6 is a diagram illustrating a configuration of a modification (wireless communication system 1a) of a wireless communication system 1 according to the embodiment. As illustrated in FIG. 6, the wireless communication system 1a includes a transmission station 2, a relay station 4, a reception station (first wireless communication device) 5-1, and a reception station (second wireless communication device) 5-2, and is configured to perform wireless communication such as fixed microcommunication. The reception station 5-2 is arranged in a direction different from the direction from the relay station 4 to the reception station 5-1.

The transmission station 2 is substantially the same as the transmission station 2 illustrated in FIG. 2. Each of the relay station 4 and the reception stations 5-1, 5-2 has substantially the same configuration as the reception station 3 illustrated in FIG. 3. However, the relay station 4 further has a function as a transfer unit to be described later, and relays communication between the transmission station 2 and the reception stations 5-1, 5-2.

Hereinafter, a specific operation example of the wireless communication system 1a will be described with reference to FIGS. 4 and 6, using the same reference numerals for substantially the same configurations as those described above.

The transmission station 2 assigns two transmission signals (for example, X and Y) among three (=n+1) transmission signals of X, Y, and Z to two frequency channels having different frequencies of the same polarization (FIG. 4(a)).

The transmission station 2 divides the transmission signal Z not assigned to two frequency channels into two divided signals by setting C/N to ½ of A. Then, the transmission station 2 non-orthogonally superimposes the divided two divided signals on the predetermined power signals (transmission signals X and Y) of the two frequency channels, and transmits the resulting signals as two multiplexed signals (FIG. 4(b)).

The relay station 4 receives two multiplexed signals assigned and transmitted by the transmission station 2 to two frequency channels.

Further, the relay station 4 demodulates two predetermined power signals from two multiplexed signals, creates two replica signals, subtracts the replica signals from each of the two multiplexed signals (interference cancellation processing by power difference), and combines the separated and extracted two (½)A subtracted signals. That is, the relay station 4 can restore the transmission signal Z in which C/N is A necessary for demodulation (FIG. 4(c)).

Accordingly, the relay station 4 can acquire and demodulate three (=n+1) signals of reception power that are C/N required for demodulation.

Thereafter, the transmission unit 322 of the relay station 4 transmits the transmission signals X and Y to the reception station 5-1 via the plurality of antennas 31 under the control of the control unit 30, and transmits the transmission signal Z to the reception station 5-2.

At this time, the transmission unit 322 included in the relay station 4 functions as a transfer unit that transfers the n predetermined power signals demodulated by the first demodulation unit 33 to the reception station 5-1 through n frequency channels, and transfers the subtracted signal combined by the combining unit 36 to the reception station 5-2 through any of the n frequency channels.

That is, the relay station 4 has a function as a reception device, branches the received transmission signals X and Y and the transmission signal Z, and relays the transmission signals X and Y and the transmission signal Z in different directions. Then, the reception station 5-1 receives the transmission signals X and Y, and the reception station 5-2 receives the transmission signal Z.

At this time, the relay station 4 can transmit the transmission signal Z to the reception station 5-2 while avoiding radio wave interference from the transmission signals X and Y. The relay station 4 can also transmit the transmission signal Z to the reception station 5-2 using the same frequency channel as the transmission signals X and Y without performing NOMA processing.

The wireless communication system 1a may be configured such that the transmission station 2 and the relay station 4 perform communication using the signals illustrated in FIG. 5, and the relay station 4 relays different signals to the reception stations 5-1 and 5-2.

Some or all of the functions of the transmission station 2, the reception station 3, the relay station 4, the reception stations 5-1, 5-2 may be configured by hardware such as a programmable logic device (PLD) or a field programmable gate array (FPGA), or may be configured as a program executed by a processor such as a CPU.

For example, transmission station 2, the reception station 3, and the relay station 4 according to the embodiment can be implemented by using a computer and a program, and the program can be recorded in a storage medium or provided through a network.

Figure 7:
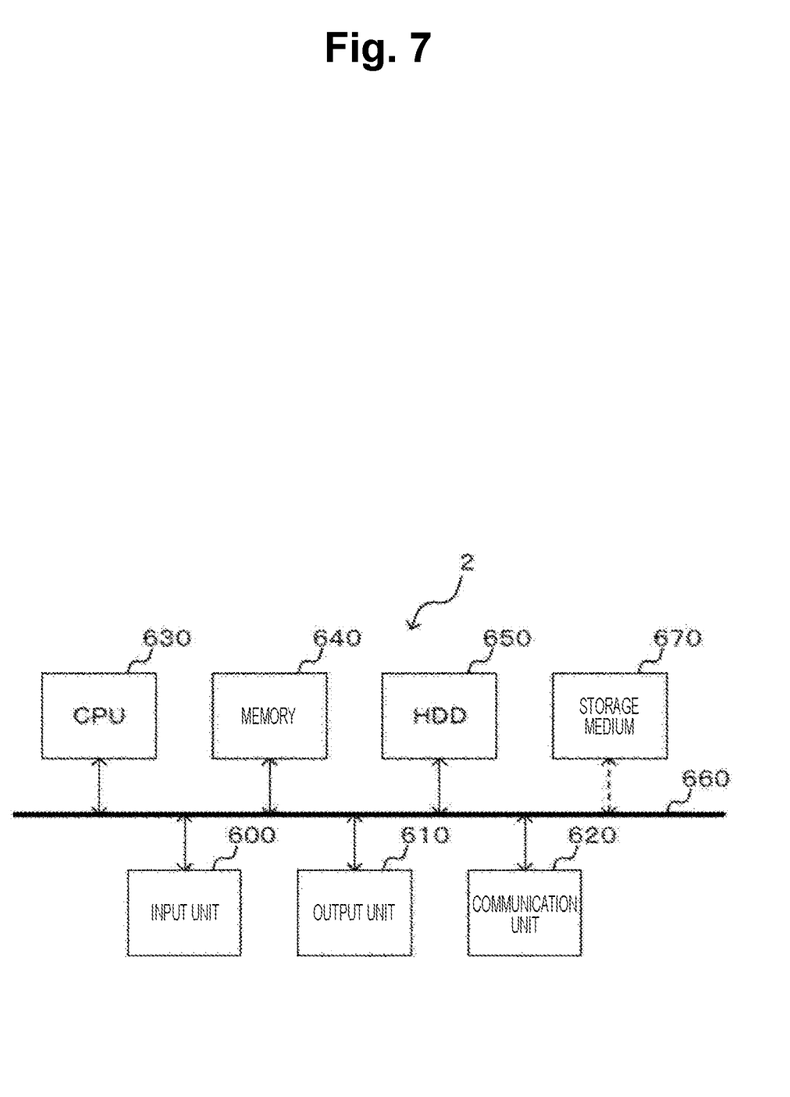
FIG. 7 is a diagram illustrating a hardware configuration example of the transmission station according to the embodiment.

FIG. 7 is a diagram illustrating a hardware configuration example of the transmission station 2 (or the reception station 3, the relay station 4) according to the embodiment. As illustrated in FIG. 7, for example, the transmission station 2 is connected to an input unit 600, an output unit 610, a communication unit 620, a CPU 630, a memory 640, and an HDD 650 via a bus 660 and has a function as a computer. The transmission station 2 can input and output data to and from a computer-readable storage medium 670.

The input unit 600 is, for example, a keyboard, a mouse, or the like. The output unit 610 is, for example, a display device such as a display. The communication unit 620 is, for example, a wireless network interface.

The CPU 630 controls each unit forming the transmission station 2, and performs predetermined processing and the like. The memory 640 and the HDD 650 are storage units that store data and the like.

The storage medium 670 can store programs and the like for executing the functions of the transmission station 2. Note that the architecture of the transmission station 2 is not limited to the example illustrated in FIG. 7.

REFERENCE SIGNS LIST 1, 1a Wireless communication system
2 Transmission station
3 Reception station
4 Relay network
5-1, 5-2 Reception station
20 Control unit
22 Modulation unit
24 NOMA processing unit
26 Communication unit
28 Antenna
31 Antenna
32 Communication unit
33 First demodulation unit
34 Replica creation unit
35 Subtraction unit
36 Combining unit
37 Second demodulation unit
240 Conversion unit
242 Superimposition unit
260 Transmission unit
262 Reception unit
320 Reception unit
322 Transmission unit
600 Input unit
610 Output unit
620 Communication unit
630 CPU
640 Memory
650 HDD
660 Bus
670 Storage medium

The invention claimed is:

1. A wireless communication system comprising a transmission device and a reception device that perform wireless communication using n (n≥2) frequency channels, wherein the transmission device includes
   a conversion unit that converts n+1 signals into n predetermined power signals obtained by setting a carrier-to-noise ratio (C/N) to a predetermined value and into n divided signals obtained by setting the C/N to 1/n of the predetermined value and performing division into n,
   a superimposition unit that superimposes the n predetermined power signals and the n divided signals converted by the conversion unit non-orthogonally so as to be n multiplexed signals for the n frequency channels, and
   a transmission unit that simultaneously transmits the n multiplexed signals obtained by superimposing by the superimposition unit by the n frequency channels, and
   the reception device includes
   a reception unit that receives the n multiplexed signals transmitted by the n frequency channels,
   a demodulation unit that demodulates the n predetermined power signals from the n multiplexed signals received by the reception unit,
   a replica creation unit that duplicates each of the n predetermined power signals demodulated by the demodulation unit and creates n replica signals,
   a subtraction unit that subtracts each of the n replica signals created by the replica creation unit from each of the n multiplexed signals received by the reception unit to calculate n subtracted signals, and
   a combining unit that combines the n subtracted signals calculated by the subtraction unit.

2. The wireless communication system according to claim 1, wherein the n frequency channels are frequency channels that are different from each other in at least one of a polarization plane and a frequency.

3. The wireless communication system according to claim 1, wherein the reception device further includes
   a transfer unit that transfers the n predetermined power signals demodulated by the demodulation unit to a first wireless communication device by the n frequency channels, and transfers the n subtracted signals combined by the combining unit to a second wireless communication device disposed in a direction different from the first wireless communication device through any of the n frequency channels.

4. A wireless communication method in which a transmission device and a reception device perform wireless communication using n (n≥2) frequency channels, the method comprising:
   a conversion step of converting n+1 signals into n predetermined power signals obtained by setting a carrier-to-noise ratio (C/N) to a predetermined value and into n divided signals obtained by setting the C/N to 1/n of the predetermined value and performing division into n;

a superimposition step of superimposing the n predetermined power signals and the n divided signals that have been converted, non-orthogonally so as to be n multiplexed signals for the n frequency channels;

a transmission step of simultaneously transmitting the n multiplexed signals obtained by superimposing, by the n frequency channels;

a reception step of receiving the n multiplexed signals transmitted by the n frequency channels;

a demodulation step of demodulating the n predetermined power signals from the n multiplexed signals that have been received;

a replica creation step of duplicating each of the n predetermined power signals that have been demodulated and creating n replica signals;

a subtraction step of subtracting each of the n replica signals that have been created from each of the n multiplexed signals that have been received to calculate n subtracted signals; and a combining step of combining the n subtracted signals that have been calculated.

5. A transmission device that performs wireless communication with a reception device by using n (n≥2) frequency channels, the transmission device comprising:

a conversion unit that converts n+1 signals into n predetermined power signals obtained by setting a carrier-to-noise ratio (C/N) to a predetermined value and into n divided signals obtained by setting the C/N to 1/n of the predetermined value and performing division into n;

a superimposition unit that superimposes the n predetermined power signals and the n divided signals converted by the conversion unit non-orthogonally so as to be n multiplexed signals for the n frequency channels; and a transmission unit that simultaneously transmits the n multiplexed signals obtained by superimposing by the superimposition unit by the n frequency channels.

6. The transmission device according to claim 5, wherein the n frequency channels are frequency channels that are different from each other in at least one of a polarization plane and a frequency.

\* \* \* \* \*